US010200522B2

(12) United States Patent
Berggren

(10) Patent No.: US 10,200,522 B2
(45) Date of Patent: Feb. 5, 2019

(54) WATERPROOF WIRELESS COMMUNICATIONS AND METHODS FOR WATER-BASED APPARATUS

(71) Applicant: WAIV TECHNOLOGIES, INC., San Diego, CA (US)

(72) Inventor: Magnus Berggren, San Diego, CA (US)

(73) Assignee: WAIV TECHNOLOGIES, INC., San Diego, CA (US)

( * ) Notice: Subject to any disclaimer, the term of this patent is extended or adjusted under 35 U.S.C. 154(b) by 0 days.

(21) Appl. No.: 15/067,408

(22) Filed: Mar. 11, 2016

(65) Prior Publication Data
US 2016/0269530 A1 Sep. 15, 2016

Related U.S. Application Data

(60) Provisional application No. 62/133,357, filed on Mar. 14, 2015.

(51) Int. Cl.
H04B 1/3888 (2015.01)
G07C 5/00 (2006.01)
H04M 1/725 (2006.01)
H04L 29/08 (2006.01)
H04W 4/12 (2009.01)
B63B 35/85 (2006.01)
B63B 49/00 (2006.01)
H04M 1/18 (2006.01)
H04B 1/38 (2015.01)
(Continued)

(52) U.S. Cl.
CPC ......... H04M 1/72527 (2013.01); B63B 35/85 (2013.01); B63B 49/00 (2013.01); H04B 1/3888 (2013.01); H04L 67/10 (2013.01); H04M 1/18 (2013.01); H04W 4/12 (2013.01); A63B 69/0093 (2013.01); A63B 2069/068 (2013.01); B63B 2035/715 (2013.01); H04B 2001/3894 (2013.01); H04M 1/72552 (2013.01); H04M 2250/12 (2013.01)

(58) Field of Classification Search
USPC ....................................... 455/556.1
See application file for complete search history.

(56) References Cited

U.S. PATENT DOCUMENTS 5,454,743 A * 10/1995 Simonson ........... B63B 35/7936
24/306
6,313,438 B1 11/2001 Emerick, Jr.
(Continued)

OTHER PUBLICATIONS

Intel has put a wireless-enabled Tablet PC in a surfboard, ComputerWeekly.com, http://www.computerweekly.com/news/2240056561/Intel-launches-first-surfboard-PC, 6 pgs. (2004).
(Continued)

Primary Examiner — Ganiyu A Hanidu
(74) Attorney, Agent, or Firm — Mintz Levin Cohn Ferris Glovsky and Popeo, P.C.

(57) ABSTRACT

A waterproof apparatus including a waterproof enclosure including electronic circuitry, a solar panel and a keypad. The electronic circuitry is configured to communicate data wirelessly when pressure is applied to the keypad. The waterproof apparatus may be mounted to watersport equipment, such as a surfboard, kiteboard, kayak, wind surfer jet ski, paddle board, or a wakeboard.

9 Claims, 14 Drawing Sheets

(51) Int. Cl.
*A63B 69/00* (2006.01)
*A63B 69/06* (2006.01)
*B63B 35/71* (2006.01)

(56) References Cited

U.S. PATENT DOCUMENTS

| | | | | |
|---|---|---|---|---|
| 6,966,808 | B1* | 11/2005 | Liao | B63B 35/7943 114/162 |
| 7,433,805 | B2* | 10/2008 | Vock | G01P 3/50 235/444 |
| 9,045,202 | B1* | 6/2015 | Alarcon | G01C 21/203 |
| 9,080,736 | B1 | 7/2015 | Salzinger et al. | |
| 9,210,534 | B1 | 12/2015 | Matthieu et al. | |
| 9,505,471 | B2* | 11/2016 | Wunner | B63B 35/7926 |
| 2004/0176000 | A1* | 9/2004 | Mann | B63B 35/7906 441/74 |
| 2005/0254778 | A1* | 11/2005 | Pettersen | H04R 1/44 386/333 |
| 2006/0109106 | A1 | 5/2006 | Braun | |
| 2007/0061107 | A1* | 3/2007 | Vock | A42B 3/046 702/182 |
| 2007/0143207 | A1 | 6/2007 | Breen | |
| 2007/0262861 | A1 | 11/2007 | Anderson et al. | |
| 2009/0042467 | A1* | 2/2009 | Huang | B63J 2/00 441/74 |
| 2010/0006314 | A1* | 1/2010 | Wilson, II | H04R 1/1091 174/50.5 |
| 2011/0238299 | A1 | 9/2011 | Nguyen | |
| 2012/0262618 | A1* | 10/2012 | Weakly | A45C 11/00 348/333.01 |
| 2013/0017743 | A1* | 1/2013 | Green | B63B 35/7926 441/79 |
| 2013/0147617 | A1 | 6/2013 | Boling et al. | |
| 2013/0222260 | A1* | 8/2013 | Tanase | H01H 13/85 345/169 |
| 2013/0346013 | A1 | 12/2013 | Lokshin et al. | |
| 2014/0072278 | A1* | 3/2014 | Kramer | H04N 5/23296 386/240 |
| 2014/0257743 | A1 | 9/2014 | Lokshin et al. | |
| 2014/0357295 | A1 | 12/2014 | Skomra et al. | |
| 2014/0376758 | A1* | 12/2014 | Barcel | H04R 1/023 381/334 |
| 2015/0070188 | A1 | 3/2015 | Aramburu | |
| 2015/0194044 | A1 | 7/2015 | Adams et al. | |
| 2016/0110976 | A1 | 4/2016 | Mains, Jr. | |
| 2018/0033311 | A1* | 2/2018 | Berggren | G01S 19/19 |

OTHER PUBLICATIONS

Jarjour, Justin, et al., The Surfer Speaker—A New Wave in Surfing, Surfer Innovations, http://www.writing.ucsb.edu/faculty/holms/surfer_speaker.pdf, 28 pgs.

Solar GPS Tracker, Linxup, http://www.linxup.com/assettrackers/atsolar.html? keyword=&matchtype=&network=g&gclid=CP3ItJu268sCFZJIfgodbLAGmg, 12 pgs. (2016).

Waterproof/Surfboard Mountable GPS Device, and can be sent with a single key press at a later time, Trace, http://www.traceup.com/, 15 pgs. (2016).

A GPS Tracker and Communication Device that has ability to send pre-configured messages, i.e. the message is composed ahead of time, and can be sent with a single key press at a later time, Saved by Spot, http://www.findmespot.com/en/index.php?cid=100. 3 pgs. (2016).

* cited by examiner

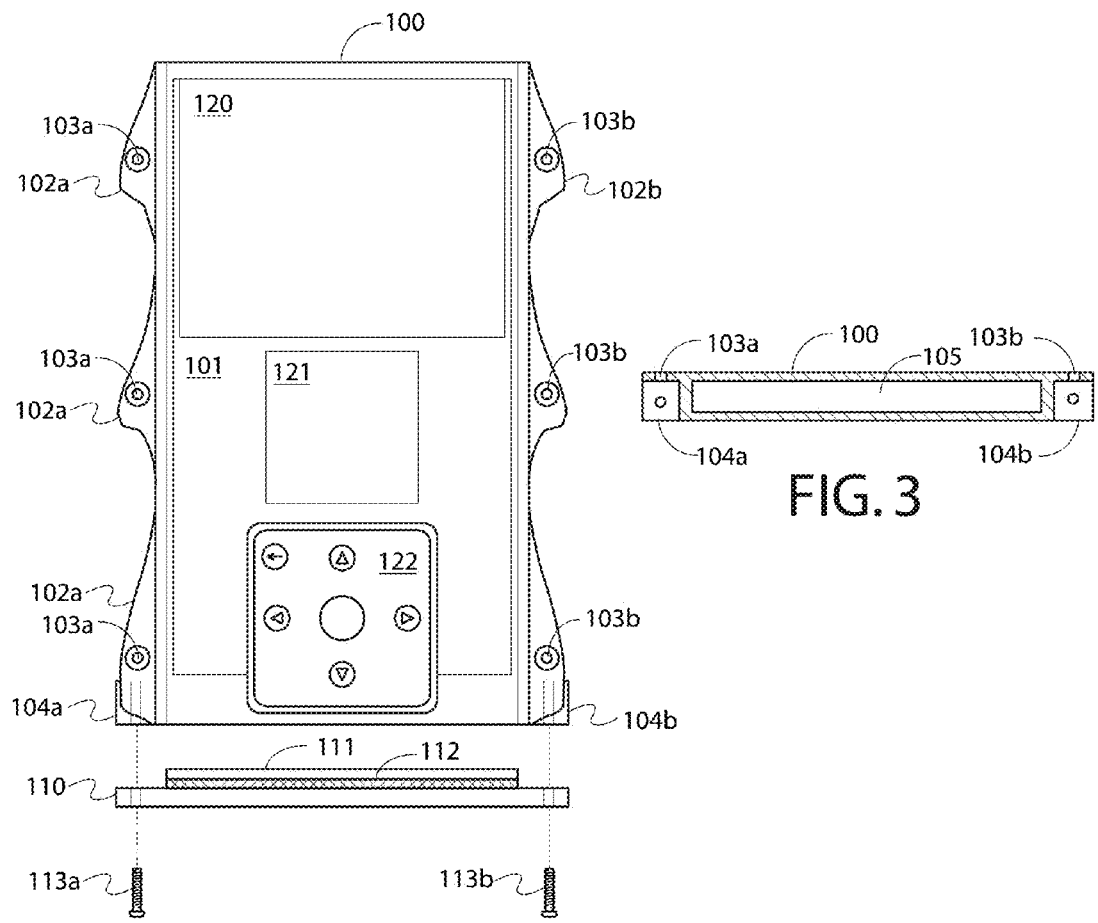
FIG. 3
FIG. 2
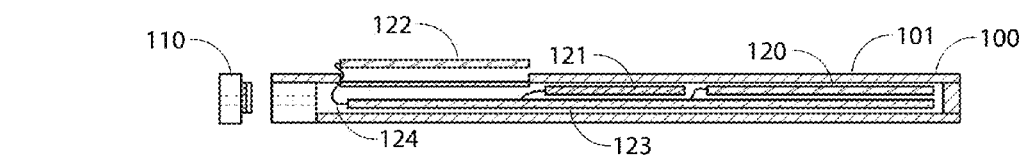
FIG. 4

WATERPROOF WIRELESS COMMUNICATIONS AND METHODS FOR WATER-BASED APPARATUS

CROSS-REFERENCE TO RELATED APPLICATIONS

This application claims priority to U.S. Provisional Patent Application Ser. No. 62/133,357 filed on Mar. 14, 2015, the disclosure of which are hereby incorporated in its entirety.

BACKGROUND

Watersports are becoming more popular and commonplace. Both experienced and non-experienced adults and children are participating in watersports, including surfboarding, paddle boarding, jet skiing, kayaking, wake boarding, wind surfing, kitesurfing, and kiteboarding.

In many cases, there is a desire to carry and operate a mobile phone while engaged in certain watersports activity. In other cases, participants want to have their mobile phones in case of an emergency, especially since several watersports are conducted on the open ocean away from land. To protect the mobile phone, waterproof casings have been developed. However, such casings are bulky, uncomfortable to wear while engaged in physical activity, and hard to operate in wet and unruly environments. In addition, mobile phones commonly contain valuable information that is tedious or even impossible to replace if the phone is lost or damaged in the water.

It is also important to ensure that any wireless device and communication method does not impact the operation of the water-based equipment, such as the surfboard, by adding weight etc. to the board. Moreover, it is also important that the wireless communication be easily accessible by the participant.

Accordingly, there is a need for systems and methods that allow participants in watersports to easily, safely, and accurately communicate wirelessly.

SUMMARY

In one aspect, a waterproof enclosure including electronic circuitry, a solar panel, a keypad, and one or motion sensors is described, wherein the electronic circuitry is configured to communicate data wirelessly in response to input from the one or more motion sensors.

In another aspect, a waterproof enclosure including electronic circuitry, a solar panel and a keypad is described. The electronic circuitry is configured to communicate data wirelessly when pressure is applied to the keypad.

In yet another aspect, an apparatus for use in watersports in disclosed that includes a waterproof apparatus mounted to a surface of watersport equipment, the waterproof apparatus including a waterproof enclosure having electronic circuitry, a solar panel and a keypad, wherein the electronic circuitry is configured to communicate data wirelessly when pressure is applied to the keypad. The watersport equipment includes a surfboard, kiteboard, kayak, wind surfer jet ski, paddle board, or a wakeboard.

The electronic circuitry may be configured to communicate the data in the form of one or more text messages when pressure is applied to the keypad. The electronic circuitry may be configured to communicate the data in the form of one or more text messages when pressure is applied to the keypad. The electronic circuitry may be configured to communicate the data to a social media website when pressure is applied to the keypad.

BRIEF DESCRIPTION OF THE DRAWINGS

The foregoing summary, as well as the following detailed description, is better understood when read in conjunction with the appended drawings. For the purpose of illustrating the implementations, there is shown in the drawings example constructions of the implementations; however, the implementations are not limited to the specific methods and instrumentalities disclosed. In the drawings:

FIG. 2 shows a waterproof apparatus in an embodiment including an enclosure top view.

FIG. 3 shows a waterproof apparatus in an embodiment including an enclosure cross sectional front view.

FIG. 4 shows a waterproof apparatus in an embodiment including an enclosure cross sectional side view.

Like reference symbols in the various drawings indicate like elements.

DETAILED DESCRIPTION

Figure 1:
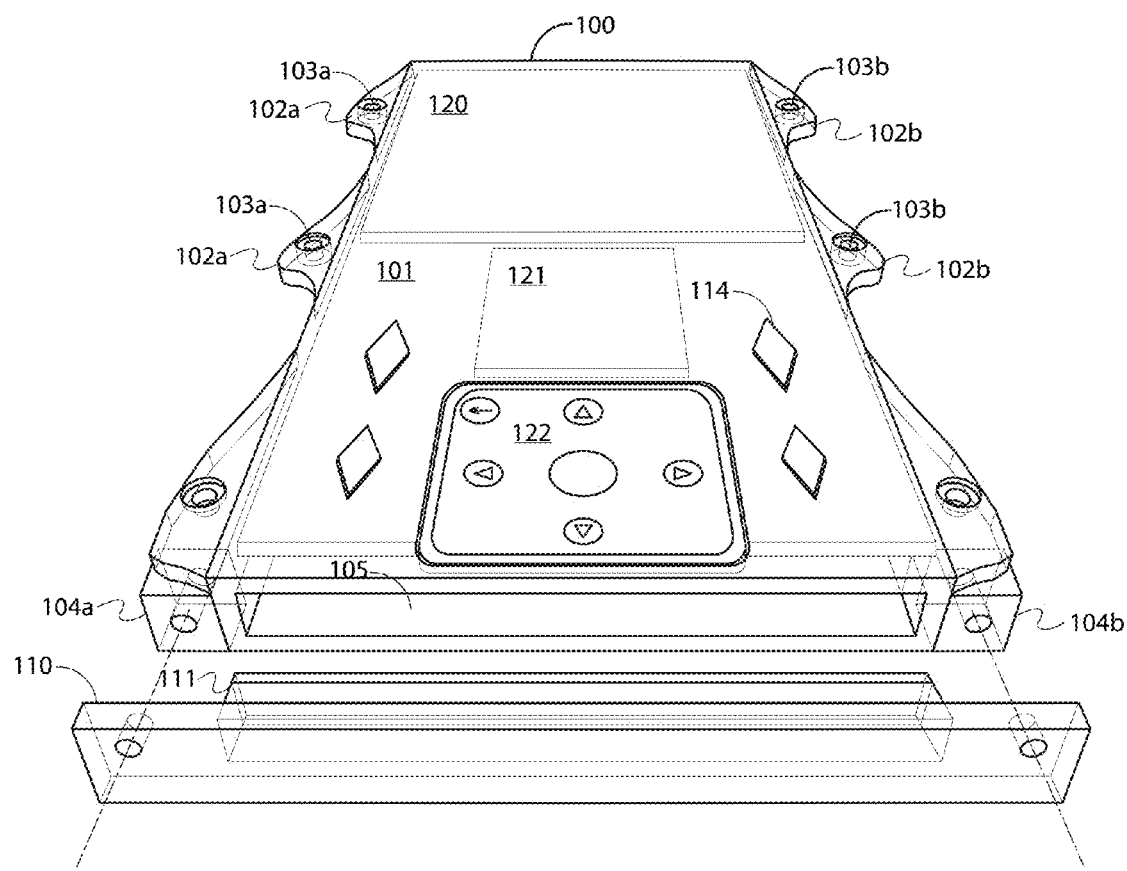
FIG. 1 shows a waterproof apparatus in an embodiment including an enclosure top-front perspective view

Each of the additional features and teachings disclosed below can be utilized separately or in conjunction with other features and teachings to provide a device, system, and/or method for a waterproof apparatus to be mounted to or integrated with watersport equipment. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Devices, methods, and systems are described for providing waterproof wireless communications. In one embodiment, the waterproof apparatus may be wirelessly connected to the Internet, a private network, or any other network capable of receiving a wireless signal. The waterproof apparatus may also communicate over any mobile phone carrier, using Time Division Multiple Access (TDMA), Global System for Mobile Communications (GSM) systems, third generation (3G) systems, Universal Mobile Telephone System (UMTS) systems, Long Term Evolution systems (LTE), and other variants. The waterproof apparatus may also communicate using satellite-based telephony.

Other data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants.

In the following disclosure, a surfboard will be used as an example of watersport equipment that may configured with the waterproof apparatus. It is to be expressly understood that the waterproof apparatus may be configured and used in substantially the same way with a kiteboard, kayak, wind surfer jet ski, paddle board, wakeboard, and the like. It should also be noted that any reference to mobile phone, mobile devices, and smartphones are meant to include any device that may be used to connect to a mobile carrier or data network to receive and/or transmit data.

In some implementations, a server may be provided to communicate with the waterproof apparatus. The server may be configured to receive and send data to and from the waterproof apparatus. In some embodiments, a software application may be provided to communicate with the server and/or the waterproof apparatus to communicate with social media, such as Facebook, Twitter, Instagram, and the like.

In one example, the waterproof apparatus includes electronic circuitry that contains a microcontroller that executes code in the form of customized software. The waterproof apparatus may include a shock resistant enclosure that contains the electronic circuitry. The waterproof apparatus may include a mounting structure that mounts the enclosure securely to the surfboard without the need of drilling holes or physically altering the equipment itself, including a surfboard. The mounting structure may provide anti-slip functionality similar to a surfboard traction pad. The mounting structure may also provide for the waterproof apparatus to have gradually raised sides that increase in height across the length of the waterproof apparatus. This means a person may easily place a foot on the apparatus, or even walk across it without risking bumping a toe into the edge of the enclosure.

In some embodiments, the enclosure may include a lid that may be removed to insert or remove the electronic circuitry. The lid may include a gasket made of a waterproof soft material so that the enclosure is waterproof when the lid is attached.

It is noted that in some waterproof enclosures have the top surface functioning as a lid, where a gasket around the edge of is used waterproof the enclosure. It has been found that when the lid is exposed to high pressure, it may slightly bend or deform, which impacts the gasket's ability to maintain the fully waterproof seal. Accordingly, in some embodiments, the enclosure is designed to be waterproof even when the top surface is exposed to pressure, like when a person steps on the enclosure with the foot. In some embodiments, the rather than using the top surface as the lid, one of the sides of the enclosure may serve as the lid. In this case, the lid may have a support bar that protrudes into the enclosure, preventing the top surface from deforming near or around the packing, when exposed to pressure.

The waterproof apparatus and associated method and systems have several advantages over the prior art. The waterproof apparatus provides a safe, convenient, and reliable way of communicating during watersports. In some embodiments, the equipment may be tracked and recorded via the motion of the equipment, by using sensors such as gyroscope, accelerometer, compass and GPS.

In other embodiments, the waterproof apparatus enables a user to enter text by entering alphanumeric letters, using the keypad on the apparatus. In other embodiments, a user may select a text to send from a list of pre-configured text messages using the keypad on the apparatus. The apparatus may be advantageously powered by solar power or using a non-backlit low powered LCD display.

FIGS. 1-4 illustrates a waterproof enclosure 100 of a waterproof apparatus in an embodiment. FIG. 1 shows the top-front perspective view, FIG. 2 shows the top view of the enclosure 100. FIG. 3 shows a cross sectional front view and FIG. 4 shows a cross sectional side view of the enclosure 100.

The enclosure top surface 101 may have a plurality of mounting brackets 102a and 102b, where each bracket has a mounting hole 103a and 103b. The brackets may be made from acrylic, acrylonitrile butadiene styrene (ABS), polylactic acid (PLA), or the like.

The enclosure may have an opening 105 on the front side, allowing insertion/removal of electronic circuitry that is hosted inside the enclosure. The lid 110 is attached or coupled to the enclosure 100 on the front side, such that a fully waterproof seal is formed between the lid and the enclosure 100. The lid 110 may be attached to the front side using screws 113a and 113b (FIG. 2) that screw into lid brackets 104a and 104b. In an alternative embodiment, the lid may be fastened using hinges on one side of the enclosure and a locking mechanism on the other side.

The lid 110 may have a support bar 111 dimensioned so that it fits exactly into opening 105. When the lid is closed (attached to enclosure 100), the support bar fits into opening 105. Support bar may include a rubber gasket 112, which provides the waterproof properties of the enclosure. The support bar may provide mechanical support to the top surface 101, so that if a person steps on the enclosure near opening 105, the support bar may prevent the top surface 101 to deform due to the mechanical pressure. As explained above, a slight deformation of the material near the waterproof gasket, such as near entry 105, could otherwise cause the enclosure to leak water.

A solar panel 120 and LCD panel 121 may be located inside, mounted to, integrated into, or coupled to the enclosure. In one embodiment, although solar panel 120 and LCD panel 121 are located under the op surface 101, they are visible as the top surface of the enclosure may be made of transparent plastic or other similar material. The material may also be waterproof.

FIG. 4 illustrates how the solar panel and LCD display are placed below the top surface. A waterproof membrane keypad 122 is attached with an adhesive glue to the top of surface 101. A keypad cable 124 goes through a small slit located under the keypad into the enclosure to connect with the main circuit board 123.

Referring again to FIG. 1, a plurality of foam pads 114 made from EVA (ethylene-vinyl acetate) or similar material are attached on the top surface to provide an anti-slip properties so that a person that steps on the enclosure with wet feet will not slip. Any material capable of creating an anti-slip surface may be used.

Figure 5:
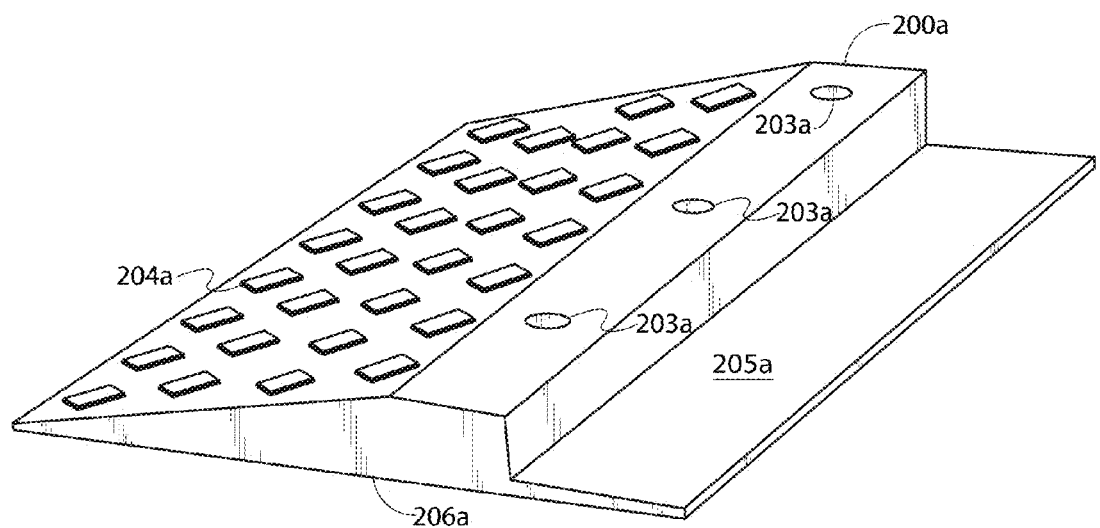
FIG. 5 shows a waterproof apparatus in an embodiment including an enclosure mount right.

FIG. 5 illustrates the left mount 200a. The bottom surface 206a of the mount is self-adhesive allowing the mount to attach to a surfboard. The left side of the enclosure may attached to this mount by screws that pass through the mount holes 103a on the enclosure 100, into the threaded mounting holes 203a on the mount 200a. In a similar manner, the right side of the enclosure is attached the right mount 200b similar to the left mount 200a.

The mount platform 205a forms a planar surface that the enclosure rests on. The mount has a rising slope 204a that is dressed with an anti-slip EVA foam carpet with a diamond shaped pattern to prevent a person walking on it from slipping. The slope provides a smooth level transition so that a person walking across the surfboard, will not bump his/her toes into the edge of the enclosure. Other patterns may be used that provide substantially the same level transition.

Figure 6:
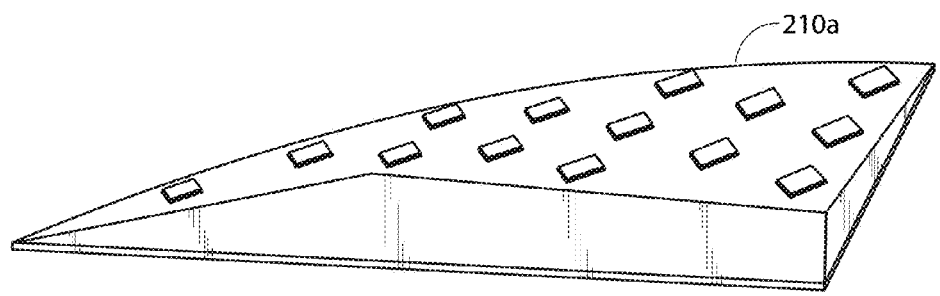
FIG. 6 shows a waterproof apparatus in an embodiment including a corner piece upper left.

FIG. 6 illustrates upper-left corner piece 210a that provides smooth-level transition and anti-slip properties substantially the same as mount 204a. Any number of corner pieces may he used. In one embodiment, four corner pieces are used.

Figure 7:
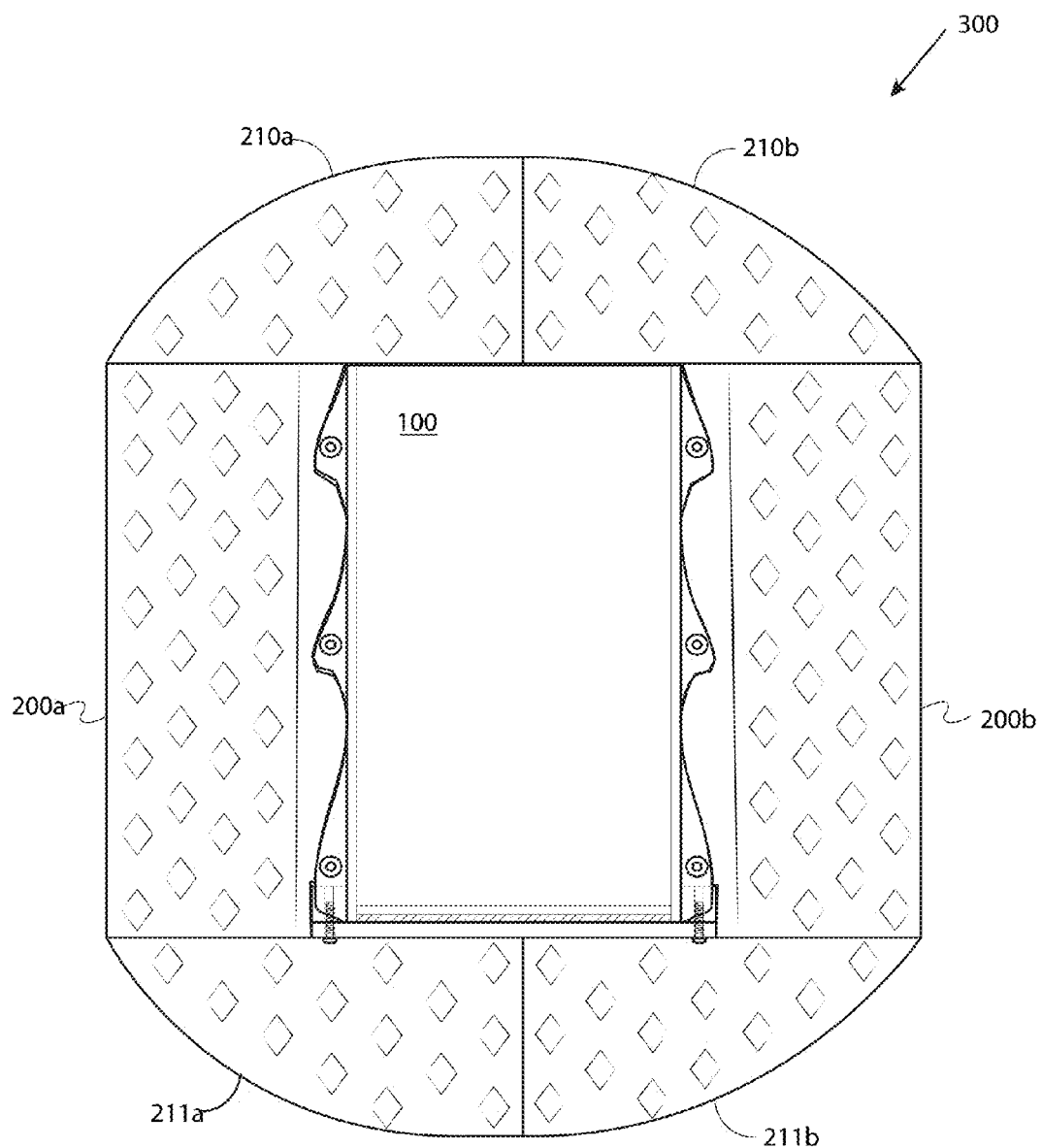
FIG. 7 shows a waterproof apparatus in an embodiment including an apparatus top view.
Figure 13:
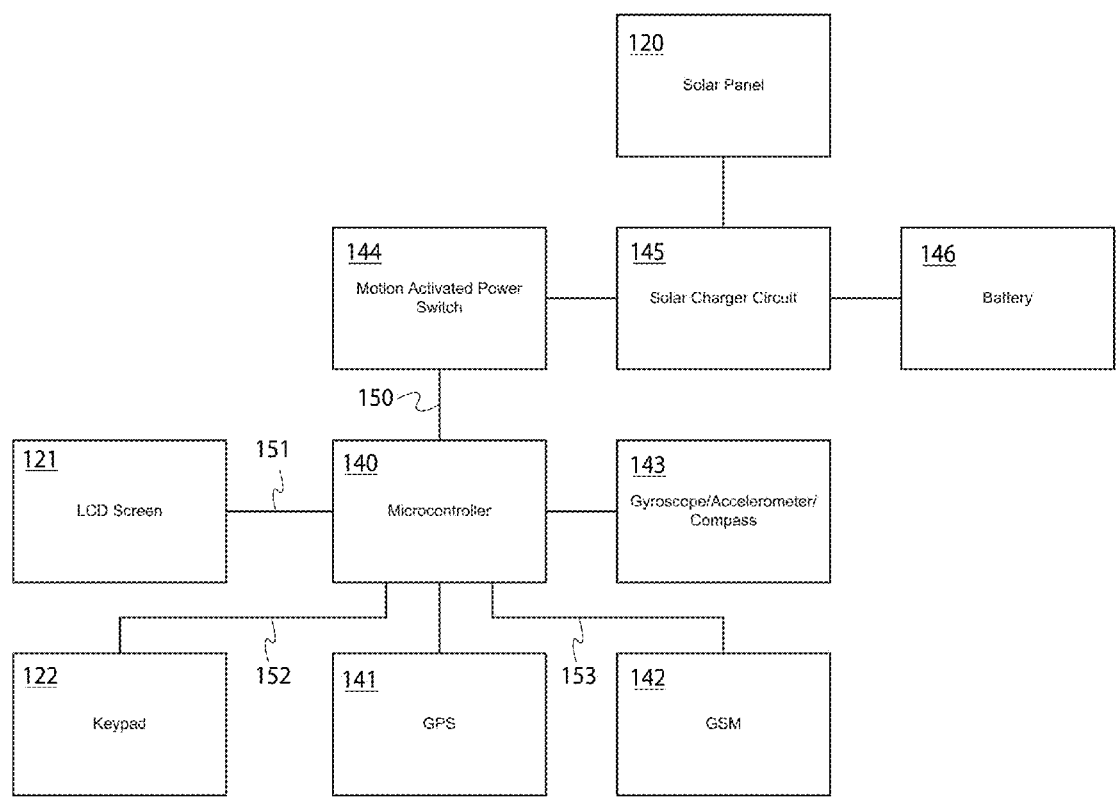
FIG. 13 shows an electronic circuitry block diagram in an embodiment.

FIG. 7 illustrates the assembly of a waterproof apparatus 300, comprising the enclosure 100, the left and right mounts 200a, 200b and the four corner pieces 210a, 210b, 211a, 211b. All these pieces, together with the electronics inside the enclosure, forms a waterproof apparatus. In one embodiment, the waterproof apparatus is designed to resemble an ordinary surfboard traction pad. It should be understood that the waterproof apparatus may include any of the enclosure 100, one or more of the mounts 200a, 200b, one or more of the corner pieces, and the electronics, for example, as shown in FIG. 13, or any combination of these components to for the waterproof apparatus.

Figure 8:
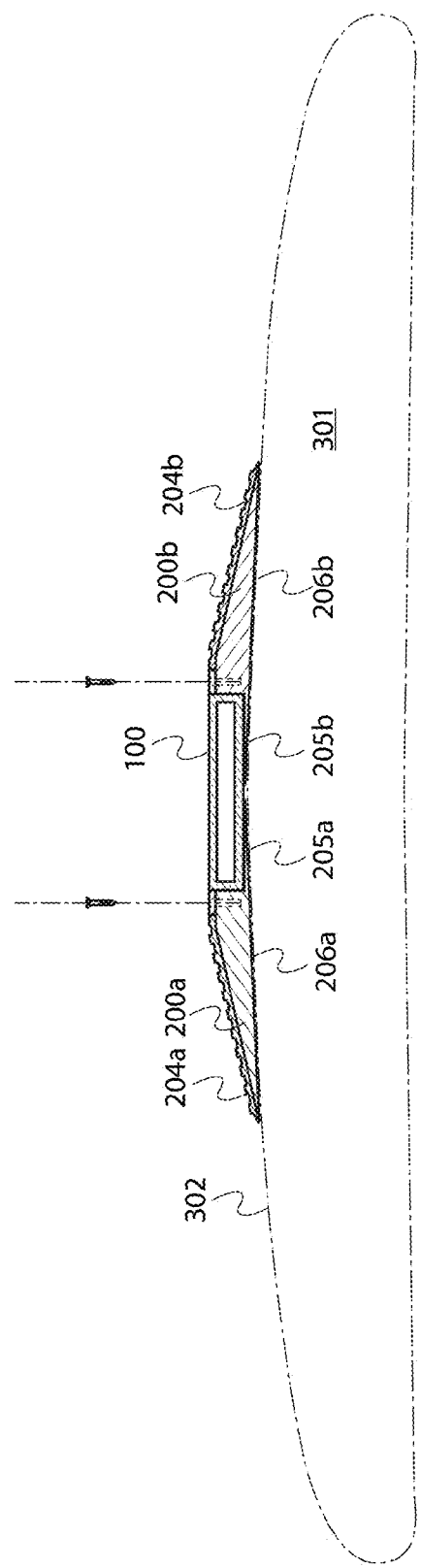
FIG. 8 shows a waterproof apparatus in an embodiment including an apparatus cross sectional front view.

FIG. 8 illustrates a cross sectional front view of the enclosure 100, left mount 200a and right mount 200b, which are attached to a surfboard 301. The top surface of the surfboard 302 may be curved. The mounts are designed so that platforms 205a and 205b form a flat surface that enclosure 100 can rest on in an embodiment. The bottom of the mounts 206a and 206b may be self-adhesive so that they can attach to the surfboard. The mounts may be dressed with an EVA foam anti-slip carpet 204a and 204b.

Figure 9:
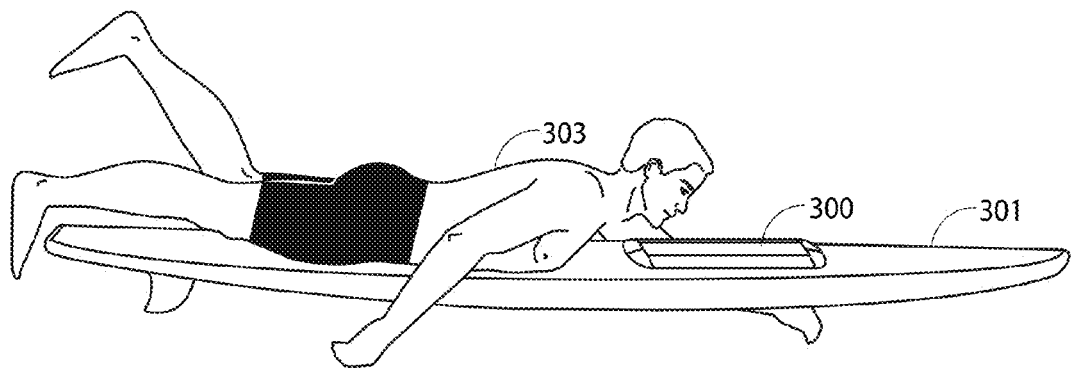
FIG. 9 shows a waterproof apparatus in an embodiment mounted in on a surfboard.

FIG. 9 illustrates placement of the apparatus 300 on the surfboard 301 in an embodiment. The placement provides for easy interaction when the surfer 303 is laying down on the surfboard in a paddling position.

Figure 10:
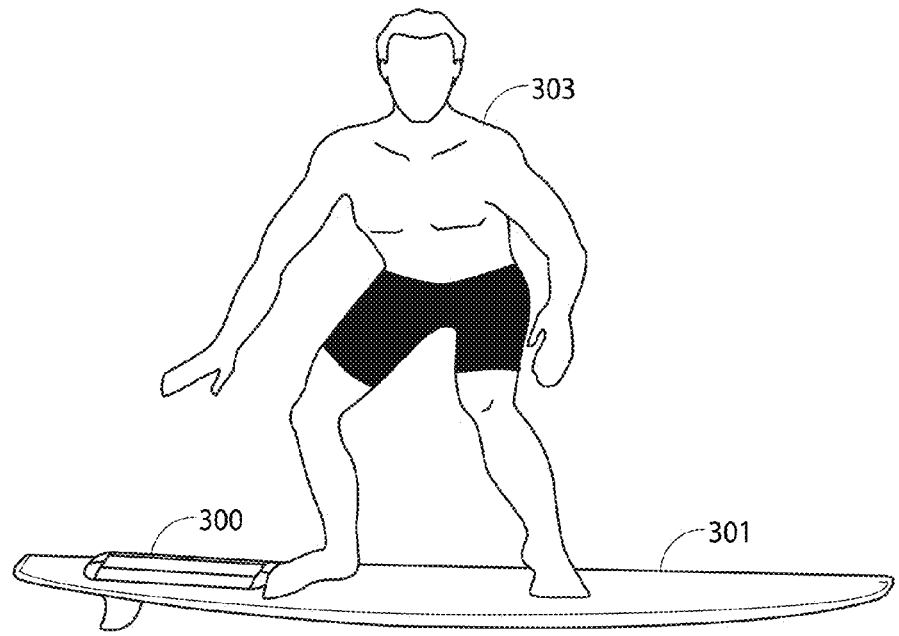
FIG. 10 shows a waterproof apparatus in an embodiment mounted on a surfboard in another embodiment.

FIG. 10 illustrates an alternate placement of the apparatus 300. In this case, the apparatus 300 may include an anti-slip carpet, such as EVA foam, that substantially mimics the functionality of a conventional surfboard traction pad. Accordingly, the apparatus 300 with the anti-slip carpet may replace a conventional surfboard traction pad.

Figure 11:
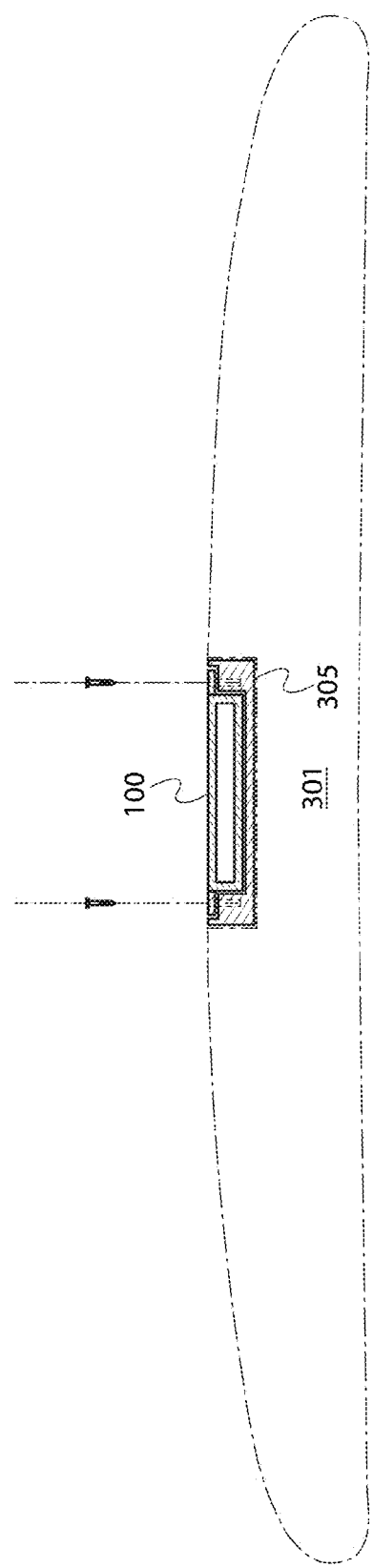
FIG. 11 shows a waterproof apparatus in an embodiment mounted on a surfboard in alternative embodiments.

FIG. 11 illustrates an alternative embodiment of the waterproof apparatus. In this embodiment, the mounts 200a and 200b as well as corner pieces 210a, 210b, 211a, 211b are not included. Instead, a mounting box 305 is built into the surfboard. The enclosure is attached to this mounting box using screws in similar way as before, however, in this case the entire enclosure 100 is leveled with the top surface of the surfboard.

Figure 12:
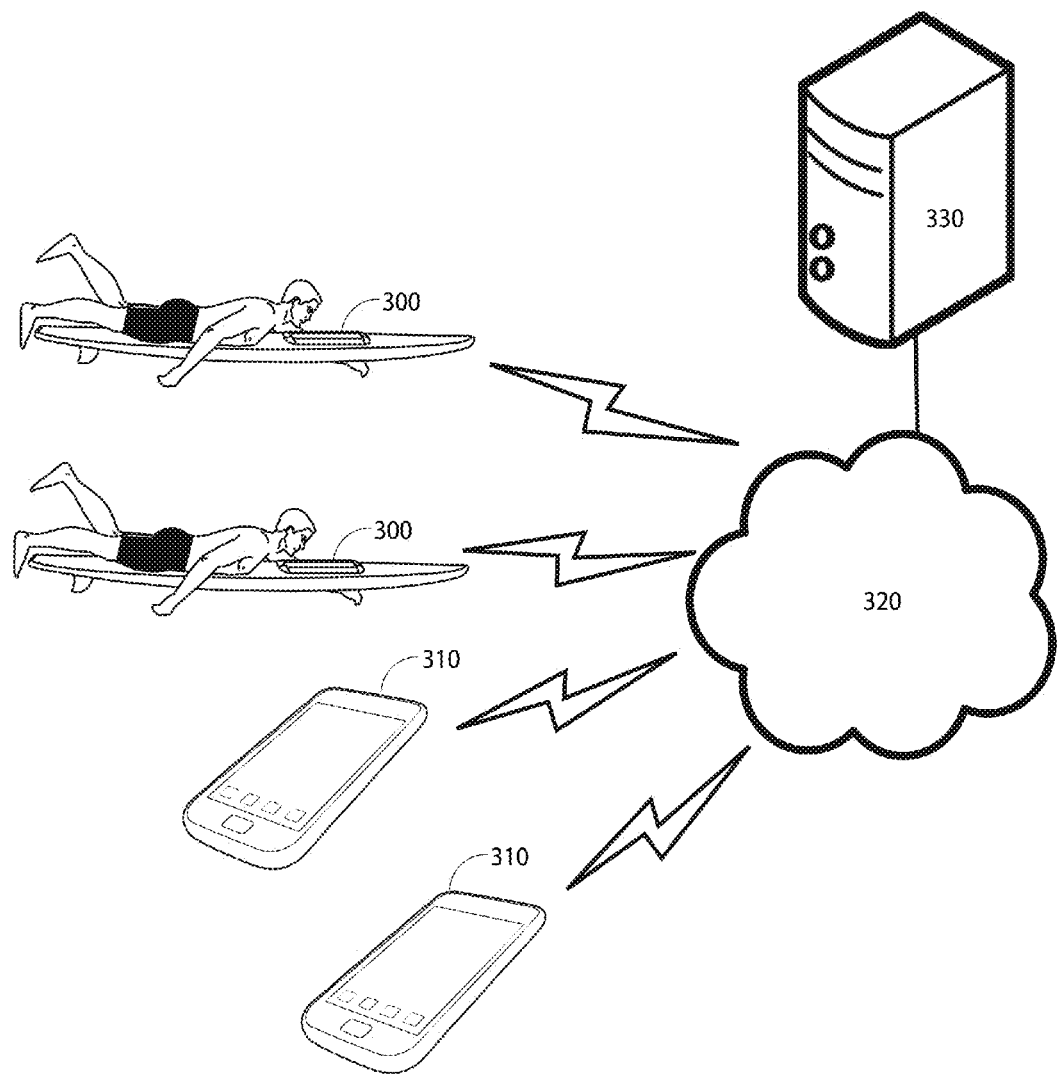
FIG. 12 shows a communication system in an embodiment.

FIG. 12 illustrates a communication system in an embodiment. A plurality of apparatuses 300 and a plurality of mobile phones 310 are all wirelessly connected to a server 330 via the Internet 320. The server 330 facilitates communication between the different devices as well as social networking functionality with Facebook, Twitter, etc.

FIG. 13 illustrates a block diagram of the electronic circuitry in an embodiment. A microcontroller 140 may be coupled to a LCD display 121, a keypad 122, a GPS module 141, a GSM radio module 142, a gyroscope/accelerometer/compass module 143, and a motion activated power switch 144.

The motion activated power switch 14 may be coupled to a solar power charging circuit 145. The solar power charging unit 145 may be connected to a solar panel 120 and a battery 146.

The motion activated switch 141 supplies power to the microcontroller 140, LCD screen 121, GPS module 141, GSM module 142 and gyroscope/accelerometer/compass module 142.

When exposed to sunlight, the solar panel 120 feeds electricity to the solar charger circuit 145. The solar charger circuit distributes power from the solar panel to charge battery 146 as well as feeding power to the motion activated power switch 144. In case the solar panel does not produce sufficient electricity to power the circuitry, the solar charger circuit may drain power from the battery instead.

The motion activated power switch (switch) has two states: 'On' and 'Off'. In the 'on' state, the switch provides power to the microcontroller and all other circuits that have their power supply input connected to the switch. The switch can enter the power on states under the following conditions:

If the switch receives a digital high input level via connection 150, the switch will remain 'on' until connection 150 goes low.

If the switch detects a motion, it will enter the 'on' state for 5 seconds. After 5 seconds, it will remain on only if connection 144 is high. Otherwise, the switch will enter the 'off' state. The delay may be shorter or longer than 5 seconds In one embodiment, when a motion is detected, the switch will enter the 'on' state. This will cause the microcontroller to power on. Software running on the microcontroller in the form of code, firmware, or the like will then set connection 150 to a digital high, preventing the switch to return to the 'off' state, which would otherwise happen if no motion is detected. The switch will remain 'on' until the software sets connection 150 to low.

The microcontroller may transmit signals to LCD display via serial data connection 151, allowing software running on the microcontroller to display content on the LCD display.

The microcontroller is connected to the keypad 122 via connection 152, allowing the microcontroller to receive user input via key presses.

The GSM module 142 provides wireless connectivity, allowing the microcontroller to send and receive data via UART connection 153.

A Gyroscope/Accelerometer/Compass circuit 143 transmits data from the gyroscope, accelerometer and compass to the microcontroller, so that it can be processed by the software in the microcontroller. Communication between 143 and 140 is done via a I2C serial connection or similar connection.

GPS Receiver 141 sends GPS data to the microcontroller via a UART connection, so that it can be processed by the software in the microcontroller.

A current sensor (not shown) may measure the net current flowing into or out from the battery. The current sensor may send current readings to the microcontroller via an I2C connection. The output of the battery may also be fed to an analog input pin on the microcontroller, allowing the microcontroller to measure the exact voltage of the battery, in order to determine the battery charge level.

The electronic circuitry may be designed to consume very low power in order to operate from solar power alone, without dependency of an external battery charger. In order to preserve power, the GPS, GSM and Gyroscope circuits may only be powered up on a per need basis. For example, the apparatus may send out its GPS position at regular interval. In that case, the GPS and GSM circuits may be powered up immediately prior to the transmission, and shut down as soon as GPS data has been obtained and transmitted via GSM. The frequency of such automatic transmissions may be regulated based on current battery level and current supply current from the solar panel so that in case of low battery or low levels of sunlight. The time interval between transmissions may be increased.

In one embodiment, the LCD screen and the microcontroller may be kept. powered on during normal operation. To conserve power in such situations, the LCD display is using a bright paper-like display that does not require any back light, and is very readable even in bright sunlight. In one embodiment, the microcontroller is a Moteino Mega manufactured by LowerPowerLabs. It is based on the ATMega family of microprocessors, and is specifically designed for lower power consumption. The embedded software is developed in C++, and is compatible with the Arduino platform (www.Arduino.cc).

Figure 17:
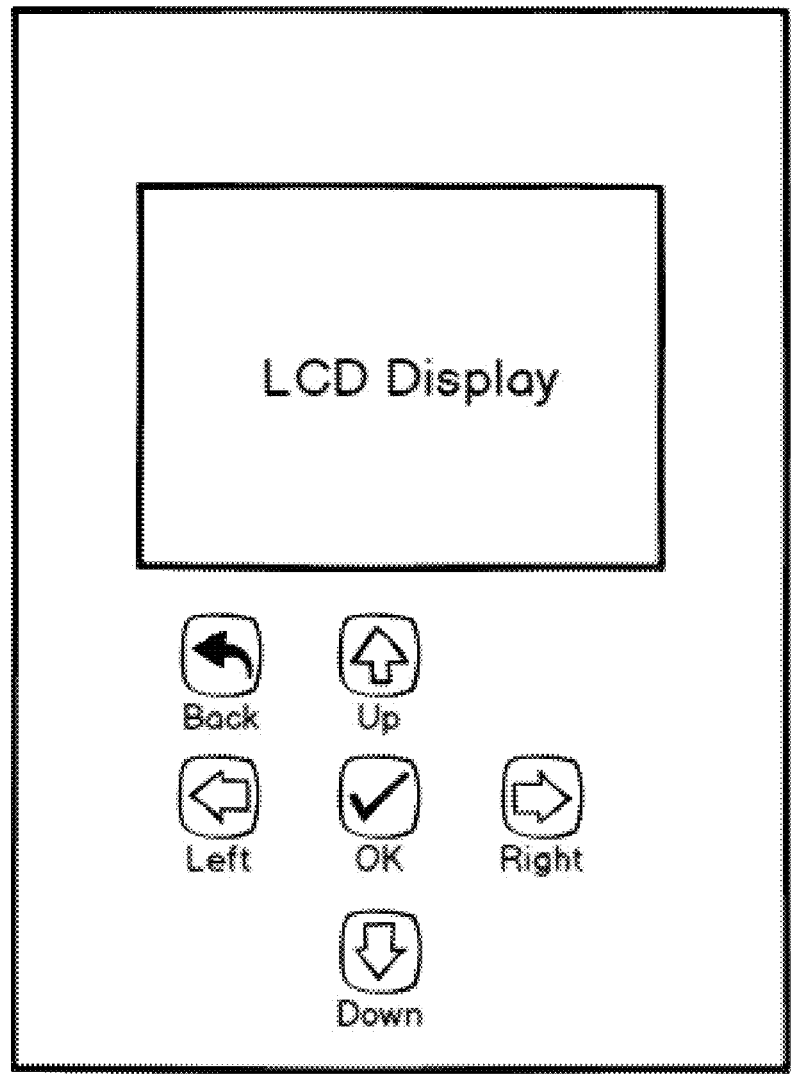
FIG. 17 shows a physical user interface of the waterproof apparatus in an embodiment.

FIG. 17 illustrates a user interface ("UI") of the apparatus. It comprises an LCD display and a keypad providing navigational keys Up, Down, Left, Right, OK, and Back. In one embodiment, the back key also serves as power off key when held pressed for a certain duration. The concept of the UI is to let the user navigate through a menu system to select appropriate actions.

In some embodiments, the systems and methods may include a mobile application that may be configured to operate with social networks and media. Users may engage with the social network by using either the waterproof apparatus, a mobile phone, or an ordinary desktop browser. One of ordinary skill in the art will understand that a desktop browser application may operate in substantially the same way as a mobile phone application described below. In one embodiment, a user of the apparatus may needs to be a user of the social network via a smartphone or other similar mobile device. The reason is that since the apparatus has a very limited user interface with no QWERTY keyboard, some user account configurations can only be done via a smartphone or similar device. User configurations may be downloaded to the user's apparatus at the next synchronization opportunity.

Figure 16:
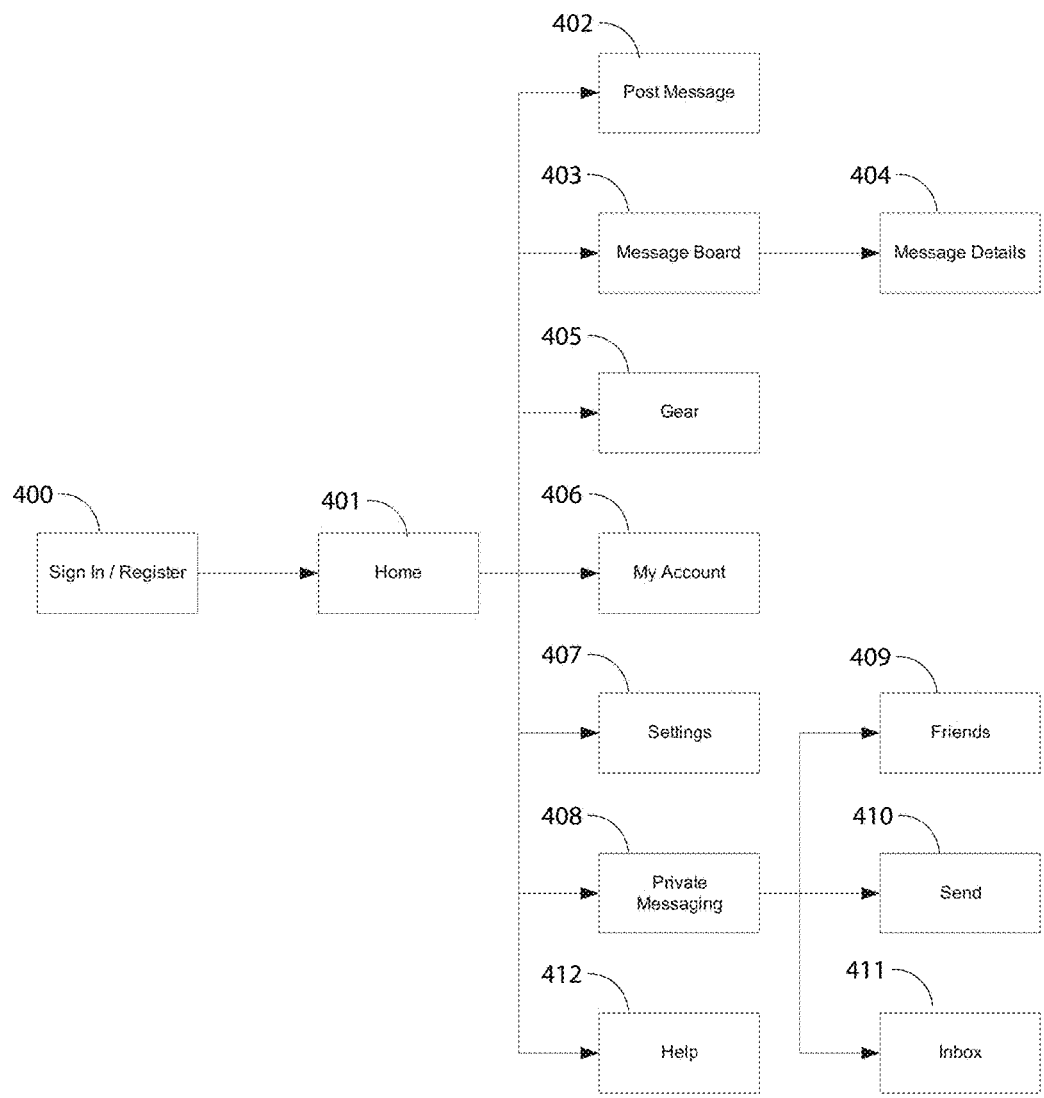
FIG. 16 shows a wire framing of mobile web application.

FIG. 16 illustrates a wireframe of the web pages that are available via a smartphone.

The Home Screen (401) serves as the landing page when a user navigates to the web address. The home screen contains a navigation menu to provide access to other screens. If user is not logged in, the user will be re-directed to the login/registration screen (400)

The Login/Registration Screen (400) lets the user register or login using one or more social network authentications, such as Twitter.

The Post Message Screen (402) lets the user post messages to his/her message board. The user can compose messages either by typing them by hand, or optionally, select a message from a menu of pre-configured phrases. The user can also add own custom phrases on this screen. Those added phrases may also be automatically downloaded to the user's waterproof apparatus.

The Message Board Screen 403 shows a list of messages. A filter menu at the top of the screen allows the user to apply a filter of which messages to view. For example, one may filter to show only messages sent by a given user, or messages sent within a certain geographic location. Clicking on a message in the list may take the user to the Message Details Screen 404

Message Detail Screen 404 shows details of a specific message. This screen may be described in more detail further below and illustrated in FIG. 15.

The Gear Screen 405 shows a list of apparatuses that have been associated with the user's account. It also facilitates entering a passcode used when associating the apparatus to a user account. The process of associating an apparatus with a specific user account is described further below. On this screen, the user can also enter a nickname for each apparatus. The nickname is intended to help identify the particular surfboard the apparatus is attached to and will show up in the details screen 404 for each message sent from the given apparatus.

My Account Screen 406 allows user update account settings such as screen name, email, and to link a social media account, such as Twitter and Facebook. The Settings Screen 407 allows the user to configure settings such as whether the apparatus should be able to send out messages automatically, or whether a GPS position should be included with the message.

The Private Messaging Screen 408 is a menu screen that allows users to select. actions regarding private messaging. The private messaging feature allows users to send private messages to friends. Messaging may be done from one apparatus to another or between an apparatus and a smartphone.

The Friends Screen 409 allows the user to view friends, invite new friends and accept invitations to become friends with user users. The Send Screen 410 allows the user to select a recipient from a list of existing friends and compose and send a message to this person.

The Inbox Screen 411 allows the user to view a list of received private messages. The Help Screen 412 provides the user with instructions how to use the invention.

New users may need to create a user account with the social network using their smartphone in some cases. In order to operate the apparatus, it must first be logged in to a specific user account. One way is to let the user enter the username and password using the UI on the apparatus. In some cases the UI may not have a full QWERTY keyboard, and thus, the login process is done with the help of a smartphone.

Figure 14:
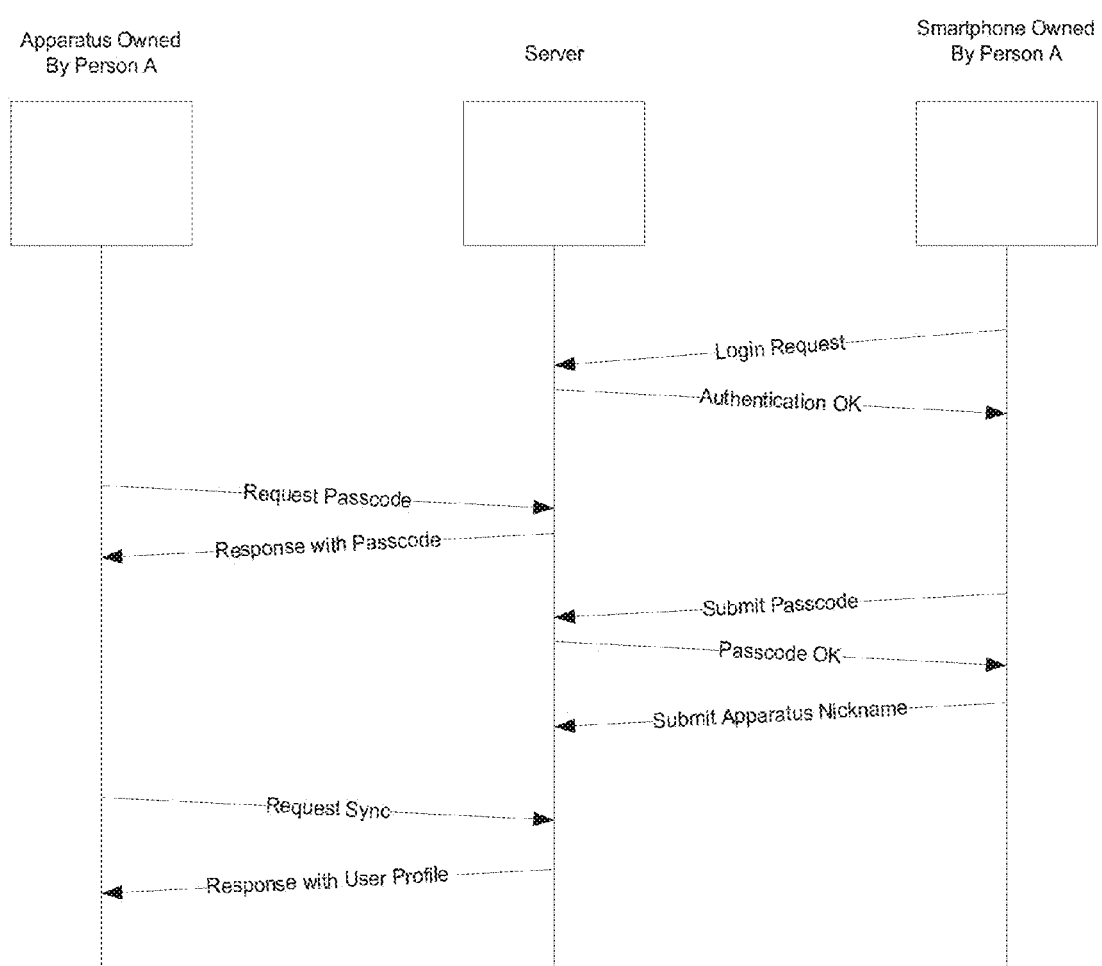
FIG. 14 shows a sequence diagram for associating an apparatus with a user account in an embodiment.

FIG. 14 is a sequence diagram illustrating the login procedure. The same person "Person A", must have access to both the apparatus and a smartphone. Note. It is assumed that the user has already registered with the social network. This may include a simple log in with Twitter credentials. In this example, the social network is integrated with Twitter. The Twitter authentication process is well described on Twitter's own website at www.twitter.com and is incorporated herein. It is to be expressly understood that any website may be used to replace twitter and such website may not need to have a social networking component. For example the website may be able to send email from the waterproof apparatus or instant messages.

As shown in FIG. 14, the steps may be as follows.

Step 1: Login Request. From the smartphone's web browser, user submits a login request (Here it is assumed the user already has registered an account).

Step 2: Login Confirmation: Upon login confirmation, the user will be taken to a web page where he/she can enter an apparatus passcode.

Step 3: Request Passcode. The user powers on the apparatus for the first time. Since the waterproof apparatus is not logged in, it will connect to the server to request a login passcode. In the request, the apparatus provides a device ID, which uniquely identifies the device. The server generates a random passcode, and saves the passcode/device ID pair of values in a passcode table.

Step 4: Response with Passcode. When the apparatus receives the passcode, it displays it on the LCD display.

Step 5: Submit passcode. The user reads the passcode on the waterproof apparatus, and enter this passcode on the smart phone and submits this to the server.

Step 6: Passcode OK. When the server receives the passcode and finds a device Id with matching passcode in the passcode table, the server may associate the looked up device Id to the logged in user that submitted the passcode. The waterproof apparatus is now logged in Step 7: The user can optionally submit nickname for the apparatus. The purpose of the nickname is the help identify the specific surfboard or sports equipment the apparatus is attached to.

Step 8: The user hits a button on the apparatus, which will request a sync to the server. The apparatus provides its unique device Id in the request.

Step 9: The server returns sync data that corresponds to the user that is now associated with the apparatus. Data includes user profile information such as username, a history of sent/received messages for the given user. From this point, the apparatus is considered logged in to a specific user account.

One feature described herein is the ability to post messages to a message board. by using the waterproof apparatus. Since the waterproof apparatus is typically operated in harsh conditions, with waves that keep jerking the surfboard around, water and bright sunlight, the way of sending messages has been specifically designed to facilitate ease of use in these types of operating conditions.

Instead of typing messages letter by letter, the user may use a menu navigation system to select from an existing list of pre-defined phrases that are commonly used in language relating to the performed activity, in this case surfing. Examples of phrases are:

"I'm currently paddling out to catch some waves",

"I just rode a sick barrel, woohoo!!!",

"Can I stay out in the water for another hour, pleease?",

"SOS!!! I have problems getting back to shore. See link for my GPS coordinates".

In addition to the pre-defined phrases, the user can also create custom phrases using his/her smart phone. These phrases will then be downloaded to apparatus that are linked to the given user. To add a custom phrase, the user must logon onto the social network via a smartphone browser, and then click on a button called "Add Custom Phrase". After clicking that button, a dialog asks the user to enter a phrase that is 120 character or less. The user then clicks OK, and the phrase has been added.

In addition, to posting messages manually, messages may also be posted automatically. For example, by using information from the GPS and Gyroscope, the apparatus may estimate that the user just entered the waves, and automatically send a message like "I'm currently paddling out to catch some waves".

When a message is sent out from the apparatus, it contains meta data in addition to the composed text. For example, the device Id of the apparatus and the GPS position.

When the server receives a message sent from an apparatus, it performs the following steps. Step 1: Parse the device Id from the message, and map it to a user Id; Step 2: Parse the GPS coordinates and map it to closest geographically located "surf spot"; Step 3: Make an API call to the website called magicseaweed.com providing the ID of the surf spot, to obtain a surf and weather report for the given surf spot. Magic Sea Weed is a $3^{rd}$ party provider, that provides surf and weather information for a large number of "surf spots", throughout the world.

Step 4: Add the message to a message board for the specific user Id. Step 5: Connect to the Twitter API and send a Tweet that contains the message as well as a link pointing back to a page on the SN, where further details about the message may be viewed.

Figure 15:
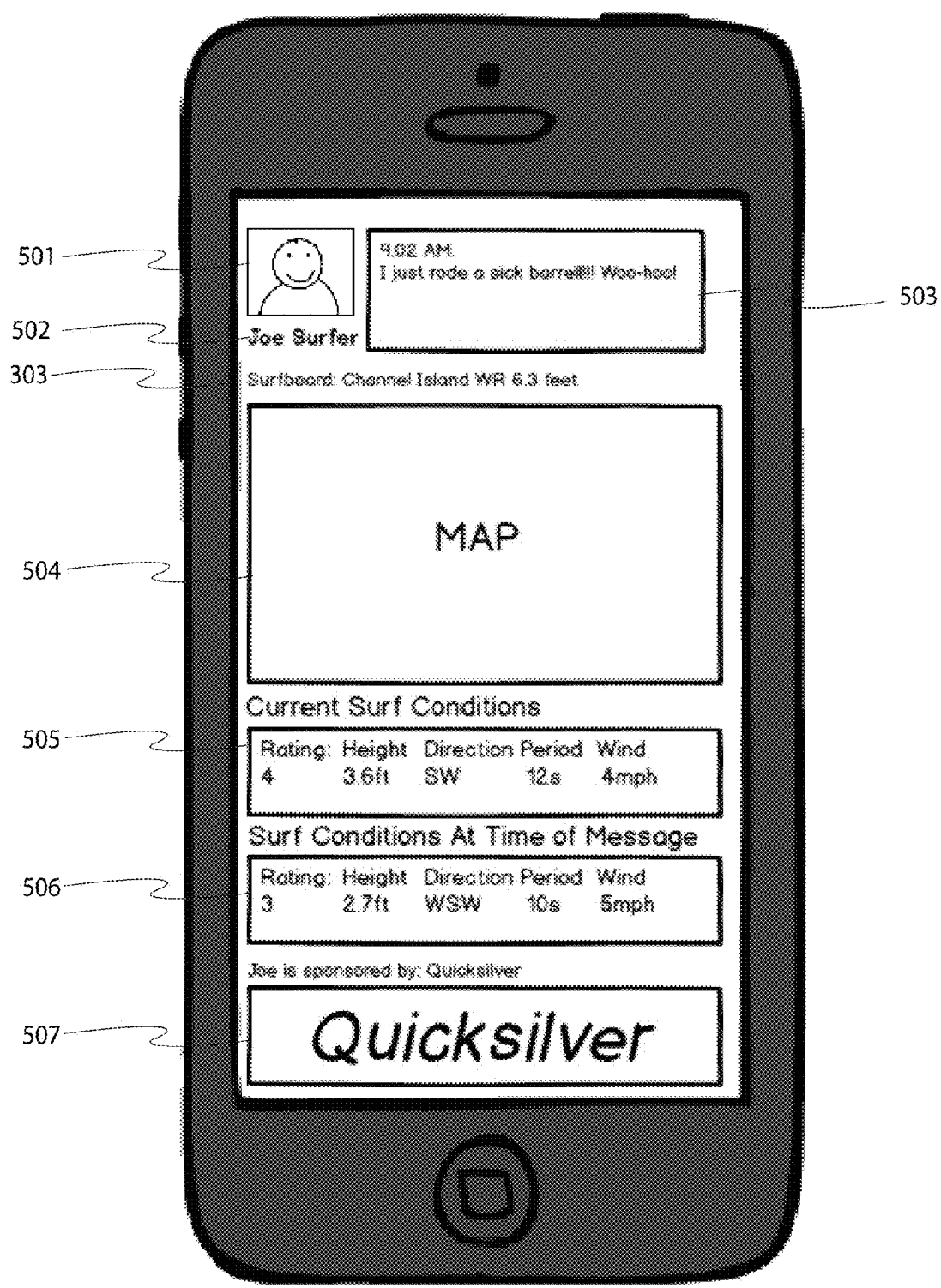
FIG. 15 shows a screen shot of mobile web page: "Message Details Page."

FIG. 15 illustrates the Message Details Screen (also shown as part of FIG. 16, reference 404), that is displayed when a user clicks the abovementioned link within the Twitter message. This page is publicly available to any user of a smartphone, even for users that are not registered with the social media. The user that sent the message may be referred to as the "sender" and the user that reads the message as the "reader".

As shown in FIG. 15, 501 is a photo of the sender. 502 is the screen name of the sender. 503 is the sent message, plus a time/date stamp. 504 shows the "nickname" that the sender has given the apparatus to represent the equipment it is attached to. Additionally, 505 shows a location on a map representing the GPS position of the apparatus when the message was sent; 506 shows the current surf and weather condition as of the time when the web page is loaded, and 507 shows the surf and weather conditions as of the time when the message was sent. In 508, an advertisement is shown. The sender may choose which advertisement should be displayed here. The sender may log on the website with his/her phone and select a sponsor from a drop down list. An advertisement from the selected sponsor may then be featured on web pages with messages from the given sender.

FIG. 17 illustrates the physical user interface on the apparatus. It comprises an LCD screen and a set of key intended for menu navigation. The keys are: Up, down, left, right, OK (select), Back and Power On/Off.

Figure 18:
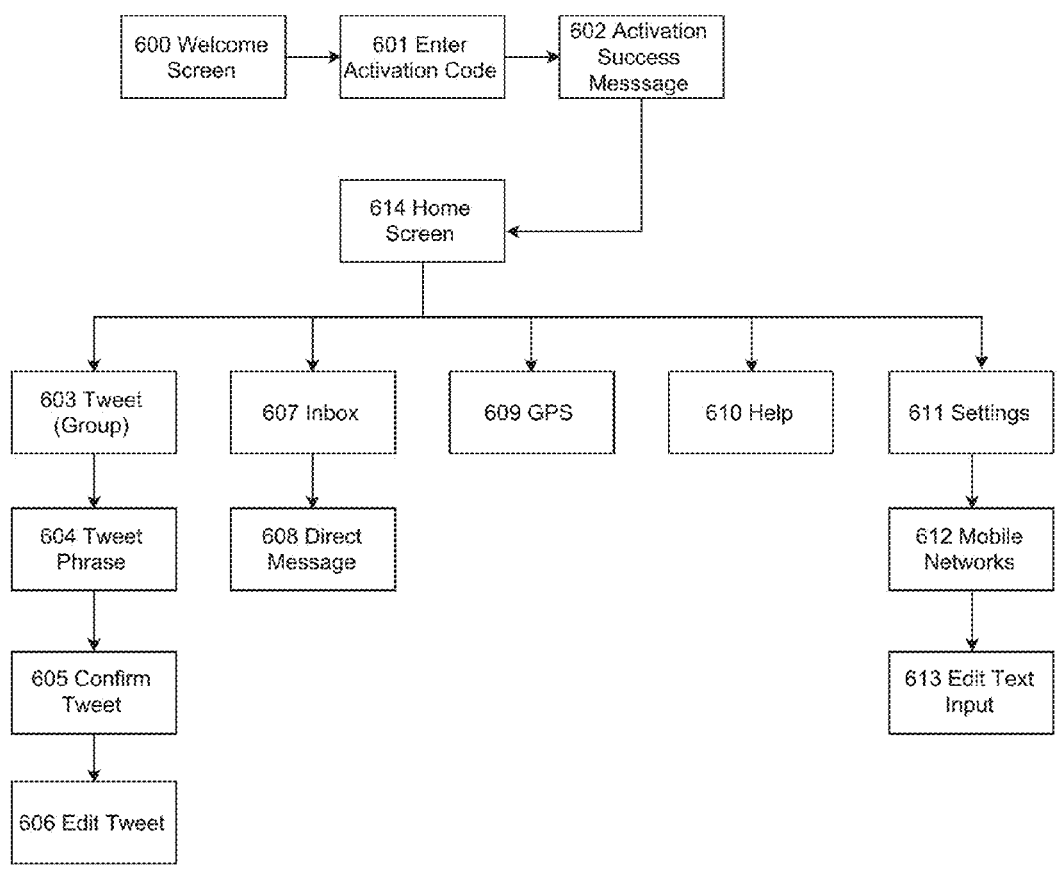
FIG. 18 shows a wire framing the software user interface in an embodiment.

FIG. 18 illustrates a wire frame diagram of the different screens that can be displayed on the apparatus.

When the device powers up, it first checks if the device is activated (logged in), by reading a boolean flag from persistent memory that indicates the last known activation state. If the flag is set, we go to the "Home Screen", otherwise to the "Welcome Screen". The various screens are described below.

Welcome Screen 600

This screen is shown when the device powers up, if the device is not activated. Pressing the OK button here takes the user to the "Enter Activation Code" screen.

Enter Activation Code Screen 601

Just before entering this screen, the device may obtain an activation code from the server. This code is then displayed on the screen. Optionally, the code may also be shown in form of a QR code. When the user clicks OK (to indicate that the activation code has been entered to the mobile/web client), the device makes a request to the server to verify if the device has been activated. If so, the user may move to the "Activation Success".

Activation Success Screen 602

This simply informs the user that the activation was successful. Clicking OK takes the user to the home screen.

Home Screen 614

This screen provides a navigation menu to the following screens: Tweet Group, Inbox, GPS, Help and Settings.

Tweet (Select Group) Screen 603

This screen lets the user select phrase group. Upon selection, the user gets to the Tweet (Select Message) Screen. In order to find a suitable phrase quickly, phrases have been organized into groups, where each group contains a multitude of phrases. So, the user selects a group on screen 603, and when then be taken to screen 604, where he/she can select a phrase from the selected group.

Tweet (Select Phrase) Screen 604

This screen shows all available phrases within the selected phrase group.

Confirm Tweet 605

This screen shows the selected phrase and offers the options to either send it or edit it. If the user click "send" the message will be sent to the server, and the user will be taken back to the home screen.

If the user clicks "edit", the user will be taken to the "Edit Tweet" screen.

Edit Tweet Screen 606

This screen shows the text message plus a keyboard on the screen. The user may use the cursor buttons to highlight keys on the keyboard, to insert selected character into the message. The user may also choose to insert a new phrase which takes the user through the group and phrase selection screens to add additional phrases to the message. Clicking "done" will take the user back to the "Confirm Tweet" screen.

Inbox Screen 607

This screen shows a list of twitter messages that have been sent to the users Twitter account as direct tweets. Selecting an item in the list takes us to the "Direct Message" screen.

Direct Message Screen 608

This screen shows a specific direct message that was selected in the inbox screen. Clicking reply will take the user to the Tweet Group Select screen where the user can follow the normal procedure of creating a tweet with the difference that the user handle from the sender of the direct message is inserted into the tweet automatically.

GPS Screen 609

Shows current data from the GPS and the compass and offers the option to turn on/off the GPS Help Screen 610

Provides information on how to use the device.

Settings Screen 611

Allows the user to change settings e.g. whether the device is allowed to send out tweets automatically. Here the user can also go to the "Mobile Networks" screen.

Mobile Networks Screen 612

This screen lets the user edit cellular network parameters such as Access Point Name. In general, users should not need to edit these parameters.

Edit Text Input Screen 613

This screen has a text input field and also displays a keyboard. The user uses the cursor to highlight keys on the keyboard, and enter text. This screen may be used to edit parameters from the Mobile Networks Screen In one embodiment, the waterproof may include comprises several sensors including a GPS, gyroscope, a compass and an accelerometer. Data from these sensors are analyzed by the microprocessor to generate what I call "motion events". For example, at the beginning of a surf session, the surfer needs to paddle through the break zone, i.e. the zone where the waves breaks. Each wave will cause the surfboard to make a sudden jerk movement that will repeat periodically as more waves rolls in. Detection of such a periodic pattern, together with GPS speed measurement that indicates that the board is on average moving at paddling speed, will generate a "Paddling Out" event. The first "Paddling Out" event that happens since the device was powered up will trigger the "Start of Surf Session" event, which will trigger the transmission of a text message indicating that the user is heading out for a surf session. If sensors indicate lack of movement for a certain time, it will generate the "End of Surf Session" event, which will trigger the transmission of a text message indicating that the surf session has ended.

In another embodiment, another event may be a "Wipe Out" event. This is triggered during a surf session when the surf board is flipped upside down, right after a sudden acceleration (based on data from gyroscope and accelerometer). This will trigger a text message, indicating that the user fell of the board while attempting to catch a wave.

The waterproof apparatus, alone and in combination with the disclosed software application and servers has several advantages. Text messages and other data may be sent from the watersport equipment. In one embodiment, the waterproof apparatus may be mounted to other types of watersports equipment, floating devices, as well as non-aquatic sports equipment, such as snowboards, motor vehicles and human powered vehicles. The waterproof enclosure may be mounted directly with or without the mounting structure. In some embodiments, the waterproof apparatus may include a water sensor that detects exposure to water, which allows the software to perform actions such as sending a message when water is detected. In some embodiments, the motion activated power switch may be replaced by a push button that allows the circuit be turned on/off using normal push button operation.

In one embodiment, the motion activated power switch may be programmed to have a different power on duration after motion detection. It can also be programmed to have different sensitivities to motions and also programmed so that it can only be re-activated after a certain delay to prevent the switch to turning on more often than desired.

In one embodiment, the waterproof apparatus may connect to peripheral devices such as action sports cameras. The waterproof apparatus may also include a Bluetooth module, enabling connectivity to Bluetooth peripheral devices such as smartwatches, video cameras or medical devices such as continuous glucose meters. In another embodiment, the microcontroller may receive a video a stream from a peripheral device connected via Wi-Fi or Bluetooth. The stream is then transmitted to a server via the cellular network. This can be used, for example, to provide live video streaming directly from a surfboard.

In one embodiment, in the login sequence where the passcode is displayed on the apparatus, a QR code is also displayed on the LCD screen. When the user scans the QR code, he/she will be directed to a web page where the user can authenticate his/her SN credentials. Since the URL contains the passcode as a GET parameter, the server can associate the given apparatus with the logged in user, and hence log in the apparatus.

In one embodiment, the apparatus may operate in a mode called "competition mode". This mode can be used by surfers participating in a surfing competition. In this mode, the apparatus may constantly stream sensor data e.g. GPS position, acceleration and velocity. This information may be followed by the audience by using a smartphone. The information may also be displayed on large TV screens so that the audience can view detailed information about the surfers that are currently out in the water. The present invention or any part(s) or function(s) thereof, may be implemented using hardware, software, or a combination thereof, and may be implemented in one or more computer systems or other processing systems. A computer system for performing the operations of the present invention and capable of carrying out the functionality described herein can include one or more processors connected to a communications infrastructure (e.g., a communications bus, a crossover bar, or a network). Various software embodiments are described in terms of such an exemplary computer system. After reading this description, it will become apparent to a person skilled in the relevant art(s) how to implement the invention using other computer systems and/or architectures.

The foregoing description of the preferred embodiments of the present invention has been presented for purposes of illustration and description. It is not intended to be exhaustive or to limit he invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art, to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for."

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly he effected across a plurality of devices and/or virtual machines. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An apparatus for use in watersports, the apparatus comprising:
a waterproof enclosure having electronic circuitry with wireless communication, a solar panel to power the electronic circuitry, a keypad to receive input from a user to activate the electronic circuitry, and a motion sensor to detect a motion and/or location of the waterproof enclosure to generate motion data and/or location data, wherein when activated by the input from the user applied to the keypad, the electronic circuitry is configured to analyze the motion data and/or the location data for determining a type of action being performed by the user and communicate data indicating the determined type of action wirelessly via the wireless communication; and
a mounting structure for mounting the waterproof enclosure to a surface of watersport equipment.

2. The apparatus in accordance with claim 1, wherein the keypad includes a user interface with predetermined instruction keys.

3. The apparatus in accordance with claim 1, wherein the wireless communication includes one of Time Division Multiple Access (TDMA), Global System for Mobile Communications (GSM) systems, third generation (3G) systems, Universal Mobile Telephone System (UMTS) systems, Long Term Evolution systems (LTE), and satellite-based telephony.

4. The apparatus in accordance with claim 1, wherein a top surface of the waterproof enclosure includes the keypad.

5. The apparatus in accordance with claim 4, wherein the top surface of the waterproof enclosure and the keypad are formed of an anti-slip material.

6. The apparatus in accordance with claim 5, wherein the anti-slip material includes EVA foam.

7. The apparatus in accordance with claim 1, wherein the sensor includes one or more of a global positioning system (GPS), a gyroscope, a compass, and an accelerometer.

8. The apparatus in accordance with claim 1, wherein the type of action includes starting a watersport activity or stopping the watersport activity.

9. The apparatus in accordance with claim 1, wherein the type of action includes performing a particular action associated with a watersport activity.

\* \* \* \* \*